United States Patent [19]

Bernemann et al.

[11] 4,182,814

[45] Jan. 8, 1980

[54] PROCESS FOR THE PRODUCTION OF POLYBUTADIENE HAVING A HIGH CIS-1,4-CONTENT

[75] Inventors: Paul Bernemann, Haltern; Rudolf Kentschke; Dieter Wieland, both of Marl, all of Fed. Rep. of Germany

[73] Assignee: Chemische Werke Huels, A.G., Marl, Fed. Rep. of Germany

[21] Appl. No.: 918,240

[22] Filed: Jun. 23, 1978

[30] Foreign Application Priority Data

Jul. 9, 1977 [DE] Fed. Rep. of Germany ....... 2731067

[51] Int. Cl.² ...................... C08F 136/06; C08F 4/80
[52] U.S. Cl. ...................................... 526/92; 526/86; 526/88
[58] Field of Search ............................ 526/92, 88, 86

[56] References Cited

U.S. PATENT DOCUMENTS 3,066,127  11/1962  Carlson et al. ...................... 526/93

FOREIGN PATENT DOCUMENTS 795860  10/1968  Canada .
1028088  11/1964  United Kingdom ...................... 526/92

*Primary Examiner*—William F. Hamrock
*Attorney, Agent, or Firm*—Millen & White

[57] ABSTRACT

A process for the production of polybutadiene having a high cis-1,4-content by the polymerization of 1,3-butadiene in an aliphatic solvent in the presence of a catalyst consisting essentially of
 (a) an organoaluminum compound,
 (b) water, and
 (c) a cobalt compound soluble in the aliphatic solvent, is improved by the combination wherein the 1,3-butadiene is polymerized at a temperature of 0°–100° C., the aliphatic solvent is hexane; the catalyst consists essentially of
 (a) diethylaluminum chloride,
 (b) water, and
 (c) cobalt octoate, cobalt naphthenate or a mixture thereof;

and the catalyst components are added to a mixture of the 1,3-butadiene and the hydrocarbon solvent in the sequence of (a), then (b), and then (c), wherein the mixture is homogenized after addition of each catalyst component.

5 Claims, No Drawings

4,182,814

PROCESS FOR THE PRODUCTION OF POLYBUTADIENE HAVING A HIGH CIS-1,4-CONTENT

BACKGROUND OF THE INVENTION

The present invention relates to a process for the production of polybutadiene having a high cis-1,4-content.

A process is disclosed in Canadian Pat. No. 934742 for the polymerization of conjugated diolefins in the presence of catalysts which are compounds of metals of Group VIII and organometallic compounds of metals of Group III of the Periodic Table of the Elements to obtain polymers having essentially a cis-1,4-content. In this process, homogeneous solutions of catalysts consisting of a cobalt compound and an alkyl aluminum halide are employed. The polymerizing medium is constituted by cycloaliphatic and preferably aromatic hydrocarbons, such as, for example, benzene or mixtures made from these solvents and aliphatic hydrocarbons.

Another process for the production of polybutadiene having a high cis1,4-content is known from U.S. Pat. No. 3,066,127. In this process, 1,3-butadiene is polymerized in a non-aqueous solution with one of several compounds of cobalt and/or nickel and one or several organoaluminum compounds, preferably alkyl aluminum compounds, as the catalyst in the presence of a specified quantity of water. The solvent is preferably constituted by aromatic hydrocarbons. The utilization of benzene as the sole diluent is a preferred embodiment of the polymerization of butadiene with the catalyst claimed. On the other hand, aliphatic hydrocarbons can only be used in combination with cyclic or aromatic hydrocarbons.

As can be seen from these comments on the relevant state of the art processes, aromatic hydrocarbons, preferably benzene, are favored as the solvent in the production of, for example, polybutadienes having a high cis-1,4-content using soluble cobalt- and/or nickel-containing catalysts of the Ziegler-Natta type. The reason is that these aromatic hydrocarbons support the formation of soluble catalysts as well as being especially good solvents for the polymer formed.

Despite these good properties, however, aromatic hydrocarbons, because of their toxicity, and especially benzene, because of its carcinogenic effect, pose a great danger to the environment. Consequently, there has been an ongoing effort to replace the toxic aromatic solvents with less toxic ones.

Thus, a process is described in U.S. Pat. No. 4,020,255 for the production of polybutadiene having a high cis-1,4-content in which the butadiene is polymerized in a mixture using an aliphatic or cycloaliphatic solvent. The polymerization catalyst therein consists of (a) a trialkyl aluminum compound, (b) a nickel-carboxylic acid salt and (c) a boron trifluoride etherate. However, such catalysts are very expensive and difficult to handle. A process is also described in Canadian Pat. No. 795,860 (Chem. Abstr. 62, 6658d) wherein a catalyst of (a) diethylaluminum chloride, (b) water and (c) cobalt dioctoate is used to polymerize butadiene. Although general aromatic and aliphatic solvents are disclosed, the specific solvent utilized is benzene and the catalyst components are employed in the sequence (b), (a) and then (c).

SUMMARY OF THE INVENTION

Accordingly, it is an object of the present invention to develop a process for the production of polybutadiene having a high cis-1,4-content which employs as solvents exclusively aliphatic solvents as well as easy to handle and reasonably-priced catalysts.

It is another object of this invention to provide such a process wherein the conversion rate and yield are highly satisfactory.

Upon further study of the specification and appended claims, further objects and advantages of this invention will become apparent to those skilled in the art.

These objects have been attained by providing an improved process for the production of polybutadiene having a high cis-1,4-content by the polymerization of 1,3-butadiene in an aliphatic solvent in the presence of a catalyst consisting essentially of
  (a) an organoaluminum compound,
  (b) water, and
  (c) a cobalt compound soluble in the aliphatic solvent, wherein the improvement resides in the fact that the 1,3-butadiene is polymerized at a temperature of 0°–100° C., the aliphatic solvent is hexane; the catalyst consists essentially of
  (a) diethylaluminum chloride,
  (b) water, and
  (c) cobalt octoate, cobalt naphthenate or a mixture thereof;

and the catalyst components are added to a mixture of the 1,3-butadiene and the hydrocarbon solvent in the sequence of (a), then (b), and then (c), wherein the mixture is homogenized after addition of each catalyst component.

All features recited above under the improvement are critical in obtaining the superior results of this invention.

DETAILED DISCUSSION

The superior results achieved by the process of this invention are surprising, because the utilization of hexane, especially in the large-scale industrial production of polybutadiene having a high cis-1,4-content with the aid of Ziegler-Natta catalysts, has heretofore only produced insufficient conversion rates and yields (U.S. Pat. No. 4,020,255).

According to this invention, hexane is used as the solvent. Hexane is utilized because it is an industrially inexpensive product, is especially less dangerous to health compared to the aromatic substances and, for industrial processes, exhibits especially advantageous physical properties such as boiling point and freezing point. Generally, 2-20, preferably 4-9 wt. parts of the hexane solvent per wt. part of 1,3-butadiene monomer are employed. The purity of the hexane is not critical and commercially available industrial grade hexane may be employed.

The catalyst system employed in the process of this invention consists essentially of
  (a) diethylaluminum chloride,
  (b) water, and
  (c) cobalt octoate and/or naphthenate.

The diethylaluminum chloride (DEAC) component (a), preferably in the form of a solution in hexane, is added to the mixture made from the hexane solvent and 1,3-butadiene. Other organoaluminum compounds can also be utilized for the formation of polymerization-active catalysts; however, they exhibit disadvantages when compared to DEAC, so that from an industrial and economic viewpoint, they are of subordinate importance in the utilization of cobalt-containing Ziegler-Natta catalysts. In general, the organoaluminum compound is used in quantities of 0.05–1, preferably 0.1–0.5 percent by weight, based on the amount of 1,3-butadiene.

The water, catalyst component (b), is generally used in quantities of 0.1–0.8, preferably 0.3–0.6 mole per mole of organoaluminum compound. The water can be introduced into the polymerization system directly in pure form; dispersed in neutral carrier media, e.g., paraffin oils; or in dissolved form, i.e., as a solution, especially in the reactants themselves, e.g., 1,3-butadiene, or in hexane. If the water is introduced via a dispersion or via a solution, then the water content of the dispersions or solutions is suitably determined by a conventional Karl Fischer titration (Karl Fischer in Angew. Chem. 48 (1935), page 394).

The quantity of catalyst component (c), i.e., cobalt octoate and/or naphthenate, used in the process of this invention is 0.0005–0.01 percent by weight, preferably 0.001–0.003 percent by weight, calculated as Co, based on the amount of 1,3-butadiene used.

Suitable octoates include those from monocarboxylic acids having 8 carbon atoms. The cobalt salt of 2-ethylhexanoic acid is preferred.

Suitable napthenates include the cobalt salts of acids of the following formula $R(CH_2)_nCOOH$ wherein n is 0–3 and R is a in case substituted cyclic aliphatic alkane nucleus having 5 or 6 carbon atoms.

The sequence and the timing of the addition of the individual catalyst components are critical for obtaining the superior results of the process of this invention.

In this connection, the necessary sequence is such that first the DEAC is added to the mixture of 1,3-butadiene and hexane; this mixture is also homogenized and the water is added; then the mixture is also homogenized and finally the cobalt compound is added, thus commencing the polymerization.

In general, the process of this invention is carried out at temperatures of 0°–100° C., preferably 15°–50° C. There is no limitation on the pressure to be used during polymerization as long as it is sufficient to keep the reaction mixture—above all, the monomer that is to be polymerized—in a dissolved phase. Typically suitable pressures include 1–10 atm.

The process of this invention can be carried out continuously as well as batchwise. The duration of the polymerization varies with the degree of conversion of the 1,3-butadiene. In general, the polymerization reaction is stopped upon reaching a conversion degree of approximately 80% to 90%, typically by the addition of a conventional suitable shortstop compound, preferably an alcohol or a ketone, such as methanol, isopropanol or acetone. A conventional stabilizer, which protects the polybutadiene from the influence of oxygen, is generally also added along with the shortstop agent. Suitable such stabilizers include, for example, 2,2-methylenebis(6-tert-butyl-p-cresol) and 2,6-di-tert-butyl-p-cresol. Prior to or during the polymerization, a conventional, so-called modifier can be added to the polymerization medium to attain a determined molecular weight. Suitable such compounds which, in general, are added in quantities of from 0.01 to 0.5, preferably 0.05 to 0.2 percent by weight based on the amount of 1,3-butadiene include, for example, 1,2-butadiene, allene (propadiene) and acrylonitrile.

The shortstop and stabilizer-containing polybutadiene solution is subsequently treated in the following manner. The solvent is distilled off by the introduction of steam. Expediently, this is performed during simultaneous agitation in the aqueous phase, thereby obtaining a crumb-like product. This is sieved from the water and dried at temperatures of up to approximately 100° C.

All conditions and features of the butadiene polymerization process of this invention which are not discussed herein are fully conventional and are disclosed, for example, in U.S. Pat. No. 3,066,127, which is incorporated by reference herein.

The polybutadienes obtained by the process of this invention have a cis-1,4-content of greater than 90, preferably greater than 95% (determined by IR-spectroscopy). The 1,2-content is generally 1 to 2%. The molecular weight, expressed by Mooney value (DIN 53 523), is between 20 and 120, preferably 40 and 60. Polybutadienes are suited for many industrial purposes, especially as a raw material, for example, in the manufacture of vehicular tires, sealing profiles and conveyor belts.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

COMPARATIVE EXAMPLE I

This comparative example shows results for the polymerization of 1,3-butadiene using benzene as the solvent for comparison with the examples according to this invention using hexane as the solvent.

The following are mixed together:
benzene—430 g.
1,3-butadiene—79 g.
1,2-butadiene—0.1%, calculated on the basis of 1,3-butadiene, as a modifier
water—20 p.p.m. in the reaction mixture
The water is added to the batch with the aid of a corresponding proportion of moistened benzene. Into this batch is mixed 0.3% of DEAC calculated on the basis of 1,3-butadiene, as a 20% benzenic solution. The water:-DEAC proportion corresponds to 0.32:1 mole. The batch is completely clear and displays a yellowish-brown color after addition of the DEAC. For starting the polymerization, 0.0014% of cobalt (as a benzenic solution of cobalt octoate), calculated based on the amount of 1,3-butadiene, is added. (In the following examples, the proportion of benzene in the mixture of DEAC and cobalt octoate is calculated based on the total amount of benzene present therein from all sources. The 1,2-butadiene in the recipe aids the ability to produce a defined molecular weight of the polybutadiene which is later measured in a rotary shear viscometer in Mooney units. The batch is prepared in a pressure bottle, sealed with a crown capsule and is shaken in a water bath at 25° C. by vertical rotation of the bottle.

After four hours, the polymerization is interrupted by addition of methanol (i.e., to decompose the catalyst) and is stabilized against the influence of oxygen by the addition of a stabilizer, i.e., 0.15 g of 2,2-methylenebis(6- tert-butyl-p-cresol). The solvent is removed from the viscous solution obtained by the introduction of steam and the disintegrated polymer is dried in a circulating air drying chamber at 100° C.

The following polymerization parameters were measured:

| Operating time of the reaction | Conversion degree of the 1,3-butadiene | Mooney value of the polymer |
|---|---|---|
| [h] | [%] | [ML-4] |
| 4 | 88 | 57 |

COMPARATIVE EXAMPLE II

If the proportion of benzene in the recipe of Comparative Example I is replaced by hexane in increasing amounts, it has been found that the conversion degree declines drastically.

Recipe and sequence of the utilization of the components:

|  | (a) | (b) | (c) | (d) |
|---|---|---|---|---|
| Benzene:hexane proportion | 90:10 | 50:50 | 25:75 | 10:90 |
| Benzene | 387 g | 215 g | 108 g | 43 g |
| Hexane | 43 g | 215 g | 322 g | 387 g |
| 1,3-Butadiene | 70 g | | | |
| Water | 18 p.p.m. in the reaction mixture | | | |
| 1,2-butadiene | 0.1% based on the amount of 1,3-butadiene | | | |

Mixed into the homogenous solution of the above components are:
0.20% DEAC calculated on the basis of the 1,3-butadiene, corresponding to $H_2O$:DEAC proportion=0.43:1 mole and then, to start up the polymerization 0.0014% cobalt (as cobalt octoate), calculated on the basis of the 1,3-butadiene.

Each of the particular benzene/hexane combinations (a–d) were run in three separate experiments, and after four hours operating time at a reaction temperature of 25° C., the following conversion degree data resulted:

| Combination | Benzene/hexane Proportion | Degree of conversion from three single batches | |
|---|---|---|---|
| | | Mean Value (%) | Highest & Lowest Values (%) |
| (a) | 90:10 | 93 | 86–98 |
| (b) | 50:50 | 33 | 17–64 |
| (c) | 25:75 | 4 | 0–13 |
| (d) | 10:90 | 0 | |

In preparing the recipes, it is noticed that in the experiments (a) and (b) the solution remains clear and takes on a yellowish color, which indicates the formation of the polymerization-active, completely dissolved catalyst complex; whereas in the batches (c) and (d) no coloration of the solution occurs, but instead a turbidity is formed and colorless flakes precipitate, which indicates that the catalyst has decomposed.

COMPARATIVE EXAMPLE III

If the order of adding the catalyst components, DEAC and water, in Comparative Example II is reversed, then, surprisingly, high conversion rates are obtained even with a low benzene/hexane proportion.

The order of the mixing of the catalyst components is as follows: benzene, hexane, 1,3-butadiene and 1,2-butadiene are mixed in a carefully dried state and then DEAC is mixed thereto. Thereafter, water in the form of moist benzene is added, wherein the quantity of benzene is taken into consideration in the respective total benzene/hexane proportion. Subsequently, the polymerization is started by the addition of cobalt octoate. Except for the procedures discussed herein, the details of comparative example II were followed precisely.

In all the experiments performed, the yellow coloration of the solution indicates that the polymerization-active catalyst has formed.

The conversion degrees obtained are shown in the following table:

| Combination | Benzene/Hexane Proportion | Degree of conversion from three single batches | |
|---|---|---|---|
| | | Mean Value (%) | Lowest & Highest values (%) |
| (a) | 90:10 | 81 | 62–96 |
| (b) | 25:75 | 80 | 55–85 |
| (c) | 10:90 | 75 | 69–83 |

EXAMPLE 1

Very good degrees of conversion are obtained when pure hexane is utilized as the solvent (benzene content of the utilized hexane is less than 0.001 wt.%) if the components of the recipe are mixed together according to the following procedural method, wherein the metered quantity of DEAC is 0.4 wt.% calculated on the basis of the amount of 1,3-butadiene used.

(A) The water in added in the form of moistened 1,3-butadiene. Dry hexane, a portion of the 1,3-butadiene, 1,2-butadiene and DEAC are mixed and thereafter the remaining 1,3-butadiene provided with the correspondng water content is added. The reaction solution takes on a yellow color, the sign of the formation of a polymerization-active catalyst. After adding cobalt octoate, the butadiene polymerizes within 4 hours at 25° C. to a high degree of conversion. In eight single batches the conversion degrees are between 80 to 95% with a mean rate of 89%.

The composition of the recipe is as follows:
hexane—344 g
1,3-butadiene—56 g
1,2-butadiene —0.1% calculated on the basis of the amount of 1,3-butadiene
water—45 p.p.m. in the reaction mixture
DEAC—0.4% calculated on the basis of the amount of 1,3-butadiene corresponding to a $H_2O$:DEAC proportion=0.54:1 mole
cobalt—0.002% calculated on the basis of the amount of 1,3-butadiene (B) The water is added in the form of a dispersion. Dry hexane, 1,3-butadiene, 1,2-butadiene and DEAC are mixed together and thereafter the water is added in the form of a finely divided dispersion in a paraffin oil.

Despite the reduction in the use of DEAC to 0.3 wt.% calculated on the basis of the amount of 1,3-butadiene, high conversion degrees are obtained, which exhibit the following values in dependence on the DEAC:water proportion:

| H₂O in the Reaction Mixture [p.p.m.] | Water:DEAC Proportion [mole] | Conversion Degree [%] | Lowest and Highest Conversion Degrees of the Prepared Experiments [%] |
|---|---|---|---|
| 27 | 0.44:1 | 76 | 67–81 |
| 31 | 0.50:1 | 82 | 80–83 |
| 35 | 0.56:1 | 84 | 83–85 |
| 38 | 0.62:1 | 79 | 74–82 |

The recipe used was:
hexane—344 g
1,3-butadiene—56 g
1,2-butadiene—0.08 wt.% calculated on the basis of the amount of 1,3-butadiene
water—27, 31, 35 and 38 p.p.m. in the reaction mixture
DEAC—0.3 wt.% calculated on the basis of the amount of 1,3-butadiene
cobalt—0.0020% calculated on the basis of the amount of 1,3-butadiene (C) The water in liquid form is directly added to the reaction batch. Dry hexane, 1,3-butadiene, 1,2-butadiene and DEAC are mixed; the water is added to the batch with the aid of an injection syringe; and thereafter it is well mixed by shaking. After the addition of the cobalt catalyst, the catalyst, the 1,3-butadiene polymerizes at 25° C. within 4 hours at conversion rates of 62% on the average and between 54 and 71% as individual values in the series of experiments. The recipe data were as follows:

hexane—344 g
1,3-butadiene—56 g 1,2-butadiene—0.1 wt.% calculated on the basis of the amount of 1,3-butadiene
water—45 p.p.m. in the reaction mixture
DEAC—0.5 wt.% calculated on the basis of the amount of 1,3-butadiene, corresponding to a water/DEAC proportion=0.43:1 mole
cobalt—0.0020 wt.% calculated for 1,3-butadiene

COMPARATIVE EXAMPLE IV

The water is added to the reaction batch before addition of the DEAC. The reaction components are prepared in the following sequence: hexane, 1,3-butadiene and 1,2-butadiene are mixed together. The water is added via moistened 1,3-butadiene. This mixture is brought into rotating movement by the shaking of the reaction vessel. Then, the required amount of DEAC is injected into the moving solution in a powerful jet from a pipette and is mixed in by further shaking. The batch takes on a yellow color and after adding the cobalt octoate the polymerization begins. Depending on the water content, the following degrees of conversion are attained with a DEAC utilization of 0.4% calculated on the basis of the amount of 1,3-butadiene employed:

| Water in the Reaction Mixture [p.p.m.] | Proportion H₂O:DEAC [mole] | Conversion Degree [%] |
|---|---|---|
| 41 | 0.49:1 | 70 |
| 44 | 0.53:1 | 72 |
| 45 | 0.54:1 | 83 |
| 47 | 0.56:1 | 86 |
| 50 | 0.60:1 | 83 |
| 51 | 0.61:1 | 80 |

The composition of the recipe was:
hexane—344 g
1,3-butadiene—56 g
1,2-butadiene—0.12 wt.% calculated on the basis of the amount of 1,3-butadiene
water—variation corresponding to the above table
DEAC—0.4 wt.% calculated on the basis of the amount of 1,3-butadiene
cobalt—0.002 wt.% calculated on the basis of the amount of 1,3-butadiene The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. In a process for the production of polybutadiene having a high cis-1,4-content by the polymerization of 1,3-butadiene in a hydrocarbon solvent in the presence of 1,2-butadiene and a catalyst consisting essentially of
   (a) an organoaluminum compound,
   (b) water, and
   (c) a cobalt compound soluble in the solvent,
the improvement wherein the 1,3-butadiene is polymerized at a temperature of 0°–100° C., the solvent is hexane; the catalyst consists essentially of
   (a) diethylaluminum chloride,
   (b) water, and
   (c) cobalt octoate, cobalt naphthenate or a mixture thereof;
and the catalyst components are added to a mixture of the 1,3-butadiene 1,2-butadiene and the hydrocarbon solvent in the sequence of (a), then (b), and then (c), wherein the mixture is homogenized after addition of each catalyst component; and wherein the amount of component (a) employed is 0.05–1 wt.% based on the amount of 1,3-butadiene used; the amount of component (b) employed is 0.1–0.8 mole per mole of component (a); and the amount of component (c) employed is 0.0005–0.01 wt.% (calculated as Co), based on the amount of 1,3-butadiene used.

2. The process of claim 1, wherein component (c) of the catalyst is cobalt octoate.

3. The process of claim 1, wherein component (b) is added to the polymerization system in the form of a solution in a reactant or the solvent; a dispersion in a neutral carrier medium; or directly.

4. The process of claim 1, wherein the catalyst component (c) is cobalt octoate and the amount of component (a) employed is 0.05–1 wt.% based on the amount of 1,3-butadiene used; the amount of component (b) employed is 0.1–0.8 mole per mole of component (a); the amount of component (c) employed is 0.0005–0.01 wt.% (calculated as Co), based on the amount of 1,3-butadiene used; and the amount of hexane is 2–20 wt. parts per wt. part of 1,3-butadiene monomer.

5. The process of claim 1, wherein the catalyst component (c) is cobalt octoate and the amount of component (a) employed is 0.1–0.5 wt.% based on the amount of 1,3-butadiene used; the amount of component (b) employed is 0.3–0.6 mole per mole of component (a); the amount of component (c) employed is 0.001–0.003 wt.% (calculated as Co), based on the amount of 1,3-butadiene used; and the amount of hexane is 4–9 wt. parts per wt. part of 1,3-butadiene monomer.

* * * * *